Jan. 26, 1937.  C. LE R. HUMPHREY  2,068,747
INTERNAL COMBUSTION ENGINE MOUNTING
Filed Feb. 16, 1933   2 Sheets-Sheet 1

INVENTOR.
CARROLL LEROY HUMPHREY, DECEASED
BY VIVIAN HUMPHREY, ADMINISTRATRIX
BY
ATTORNEYS.

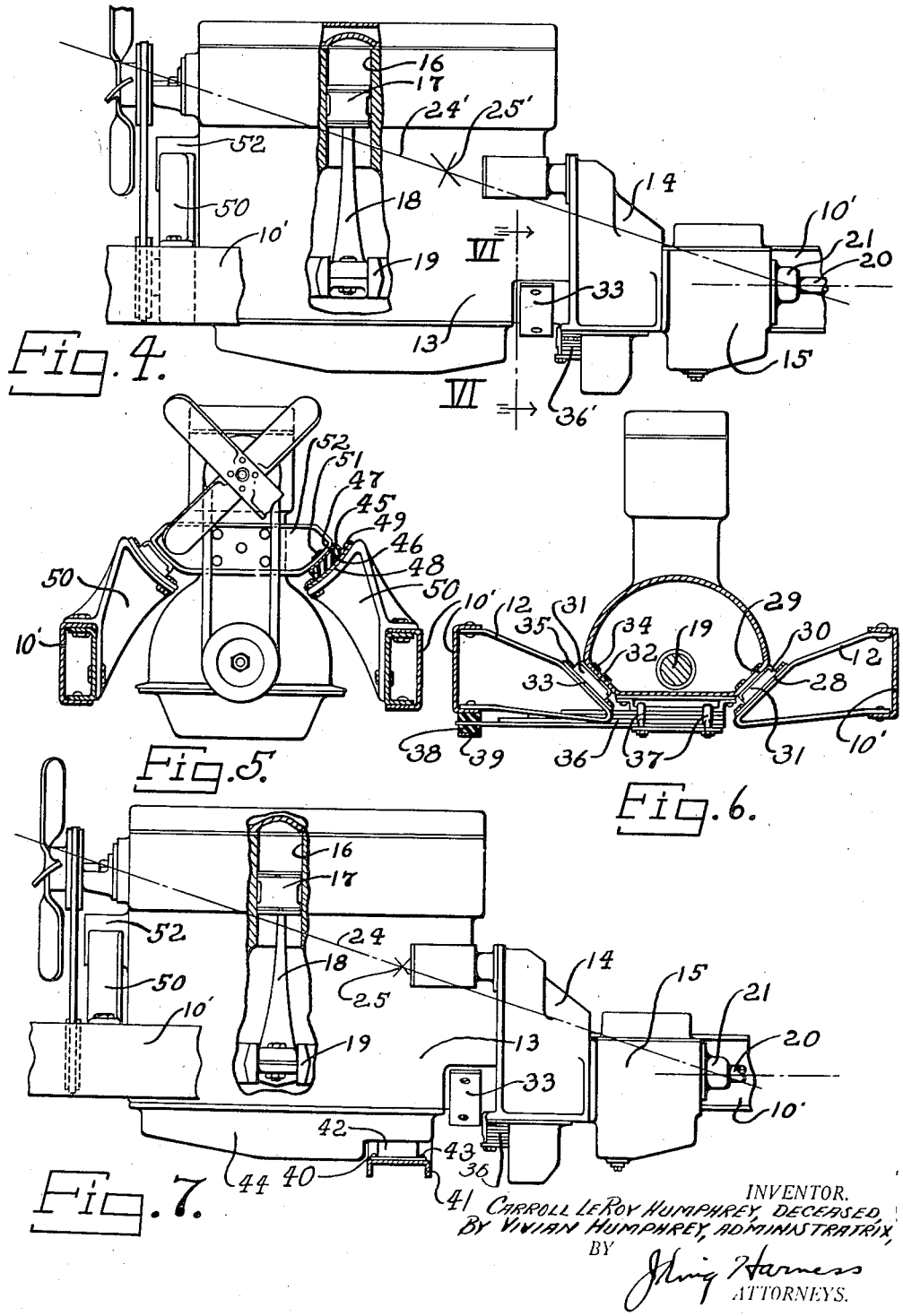

Patented Jan. 26, 1937

2,068,747

UNITED STATES PATENT OFFICE 2,068,747

INTERNAL COMBUSTION ENGINE MOUNTING

Carroll Le Roy Humphrey, deceased, late of Highland Park, Mich., by Vivian Humphrey, administratrix, Highland Park, Mich., assignor to Chrysler Corporation, a corporation of Delaware Application February 16, 1933, Serial No. 657,142

16 Claims. (Cl. 248—7)

This invention relates to improved mountings for internal combustion engine power units, such as are used for propelling vehicles, and particularly to mountings of this character which permit limited movement of a power plant during operation thereof relative to its supporting structure.

More specifically, the invention provides an improved power unit mounting having mounting members constructed and arranged in such a manner that they support the weight of the unit and also control the movements thereof relative to its supporting structure which are caused by the torque reaction impulses of the engine so as to guard against the application of severe shock and vibration upon the structure with which the power unit is associated.

One of the main objects of the invention is to provide resilient means in the mounting members of a power unit mounting of this kind which are constructed and arranged so as to yieldably support the weight of the unit and in such a manner that they control the oscillatory movements of the unit in response to the torque reaction of the engine and cause such movements to occur about a predetermined axis, preferably one which is inclined with respect to the crankshaft axis and which passes substantially through the center of mass of the power unit, so as to prevent displacement of the center of mass thereof during oscillation of the unit.

Other objects of the invention are to provide resilient means in mounting members of this kind which, though located at a considerable distance from the oscillatory axis, accurately locate such axis with respect to the structure of the power unit; to provide rubber elements in the mounting members which oppose a substantial portion of the torque reaction force by shearing action of the rubber; to provide rubber elements of this kind which are so constructed and arranged as to act mainly in compression in yieldably opposing transverse movement of the power unit relative to its supporting structure; to provide a pair of mounting members for supporting one end of the power unit which have resilient members arranged at opposite inclination in such a manner as to support a substantial portion of the weight of the unit by a combination of compressive and shear stresses of the resilient members; to provide inclined mounting members of this character which oppose lateral, longitudinal and vertical movements of the power unit relative to its supporting structure with substantial rigidity while permitting sufficiently free oscillatory movement of the power unit under the influence of the torque reaction impulses to prevent the direct application of such impulses on the supporting structure with severe impact; and to provide a pair of inclined mounting members that accomplish all of the foregoing results and in addition bring the frequency at which the unit naturally tends to vibrate or oscillate on its mountings about said axis, to a low value so that the natural vibration frequency of the unit will not synchronize with the frequency of the torque reaction impulses within the idling or driving range of the engine.

Further objects of the invention are to provide a mounting of this character which supports the weight of the engine at locations that are spaced substantially less than the entire length of the unit so as to prevent longitudinal deflection of the central part of the engine and to permit the use of parts in the power unit which are lighter in weight; to provide front and intermediate mounting members which have rubber elements that may sustain substantially the entire weight of the unit; and to provide torque opposing members in a mounting of this kind which have rubber elements constructed and arranged in such a manner as to be free from the weight of the unit and to accommodate oscillatory movement of the unit mainly in shear.

An illustrative embodiment of the invention is shown in the accompanying drawings, in which:

Fig. 4 is a side view, partly in elevation and partly in section, of a power unit mounted according to a modified form of the invention.

Fig. 5 is a front end view, partly in section and partly in elevation, of the mounting illustrated in Fig. 4.

Fig. 6 is a transverse section taken on the line VI—VI of Fig. 4.

Fig. 7 is a side view, partly in section and partly in elevation, of an internal combustion engine unit power unit which is mounted in accordance with a further development of my invention.

Figure 1:
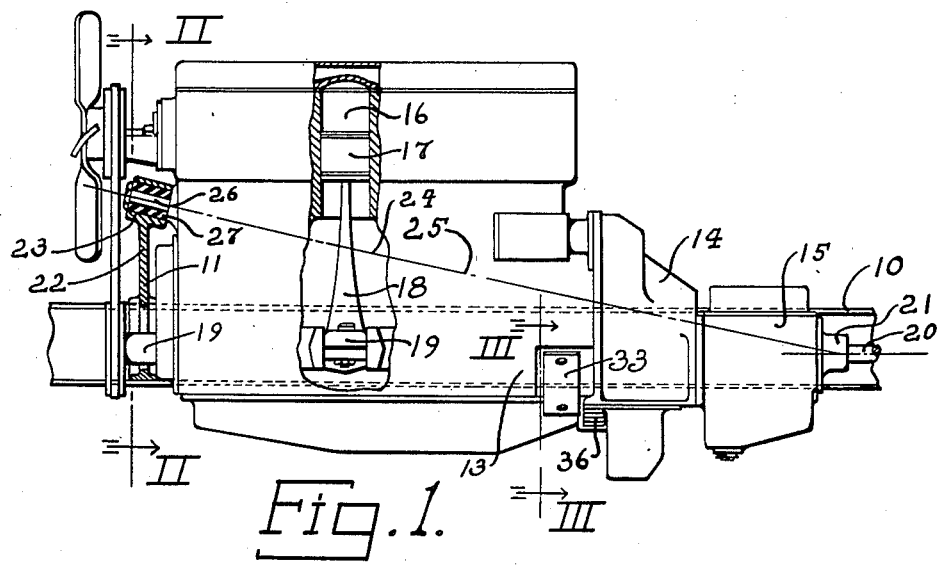
Fig. 1 is a side view, partly in elevation and partly in section, of an internal combustion engine power unit mounted according to the invention in a chassis frame of a vehicle.
Figures 2, 3:
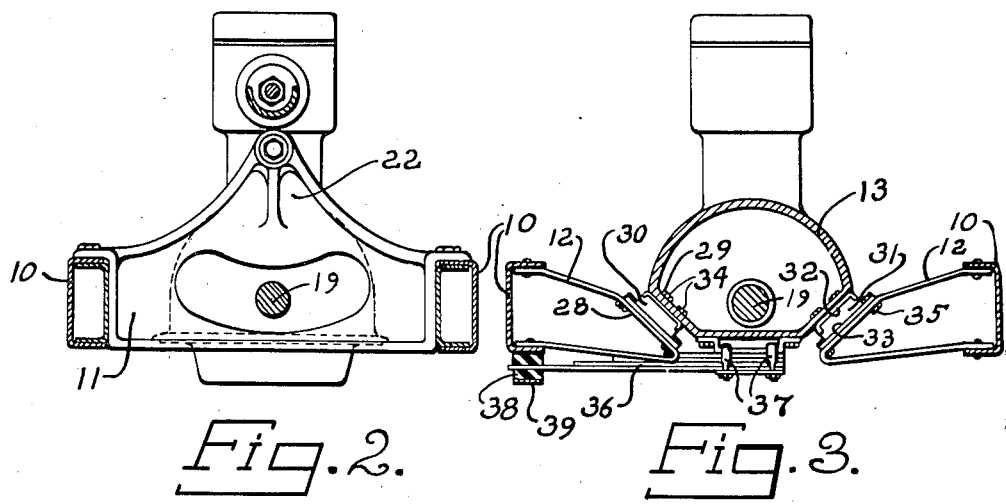
Fig. 2 is a transverse section taken on the line II—II of Fig. 1.
Fig. 3 is a transverse section taken on the line III—III of Fig. 1.

In the form shown in Figs. 1, 2, and 3, the internal combustion engine mounting is illustrated in conjunction with a vehicle chassis frame which includes spaced, longitudinal extending channel members 10 and a rigid transversely disposed front member 11 which is secured to the longitudinal channel members by means of bolts or other suitable means. A pair of rigid brackets 12 extend inwardly of the chassis frame from the respectively opposite longitudinal channel members 10 to which they are independently attached. If desired, the inner ends of the brackets 12 may be rigidly connected together so as to form a continuous transversely extending member. The transverse frame member 11 is located at the front end of the vehicle chassis frame and the inwardly extending brackets 12 are spaced rearwardly therefrom and disposed in the vicinity of the rear end of the crankcase 13 of the engine. The crankcase 13 is received between the longitudinal channel members 10 and the clutch and transmission housings 14 and 15, respectively, are rigidly fixed together and to the crankcase and longitudinally aligned therewith.

The internal combustion engine illustrated in all forms of the invention disclosed herein is of the multiple-cylinder type, having aligned cylinders 16, only one of which is shown. Slidably mounted in each cylinder is a reciprocating piston 17 to which is pivotally attached a connecting rod 18, which is journaled at its lower end on a crankshaft 19 in the usual manner. A clutch mechanism (not shown) within the housing 14 connects the crankshaft 19 with a transmission mechanism (not shown) within the housing 15 in a conventional manner and the transmission mechanism in turn drives a propeller shaft 20 through a universal or other flexible joint 21.

The transverse member 11 of the frame structure has an upstanding intermediate portion 22, best shown in Figs. 1 and 2, in which is formed a cylindrical bore 23 having an axis which coincides with the axis 24 about which it is desired to have the oscillatory movement of the power unit occur. This axis is inclined forwardly from the rear end of the power unit where it substantially intersects the axis of the propeller shaft 20 and passes substantially through the center of mass of the power unit, diagrammatically illustrated at 25 in Fig. 1. A trunnion 26 having an axis which substantially coincides with the axis of oscillation 24 is provided on the front end of the crankcase 13 and is received in the bore 23 of the front transverse member 11. The trunnion is yieldably held in concentric relationship with respect to the bore 23 of the transverse member by a resilient member 27 which, in the illustration shown, comprises a rubber collar. The rubber collar 27 may be vulcanized to the adjacent peripheries of the bore and trunnion or it may be placed under compression therebetween. If the collar 27 is bonded by vulcanization the rubber thereof is placed under an initial tension due to the shrinkage which occurs following the heat treatment employed in the vulcanizing operation.

The inwardly extending brackets 12 are provided with oppositely inclined adjacent extremities 28 which are preferably disposed substantially tangent to a circle having a center on the axis of oscillation 24 and the sides of the crankcase 13 are provided with substantially flat areas 29 which register with the inclined extremities 28 of the inwardly extending brackets. A resilient mounting member 30 is interposed between each inclined extremity 28 of the brackets 12 and each registering flat area 29 of the transmission casing. These resilient mounting members include an intermediate rubber block 31 and a pair of metal plates 32 and 33 which are bonded, preferably by vulcanization to respectively opposite sides of the rubber block. The metal plate 32 is rigidly fixed to the crankcase 13 by bolts 34 and the plate 33 is rigidly attached to the adjacent bracket 12 by bolts 35.

The inclinations at which the mounting members 30 are disposed and the attachment of the opposite plates thereof to the frame structure and power unit, respectively, cause that portion of the weight of the power unit which the rear mounting members bear to be sustained by a combination of compression and shearing stresses of the rubber. Lateral translation of the assembly is limited by compression of the rubber blocks and oscillatory movement of the unit about the axis 23 in response to the torque reaction impulses of the engine is accommodated by the rubber blocks in shear. Such oscillatory movement is opposed mainly by shearing action of the resilient rubber blocks 31 which are preferably arranged and constructed in such a manner as to bring the frequency at which the power unit naturally tends to oscillate upon its mountings and with respect to the axis 24 to a lower value than the frequency of the torque reaction impulses of the engine at the idling and lower end of the driving range thereof. This precaution is taken in order to eliminate the creation of severe vibration which is present in a vehicle when the torque reaction impulses occur in a synchronous or phased relationship with respect to the natural vibration frequency of the power unit.

In some instances, it may be desirable to employ additional means for cooperating with the rubber blocks 30 in predetermining the frequency at which the power unit naturally tends to oscillate about the axis 24. Such additional means preferably comprises a resilient member which is connected with the frame structure and engine respectively and constructed and arranged so that it is not called upon to bear any of the weight of the power unit. In the form shown, a leaf spring 36 is rigidly fixed at one end to the bottom of the crankcase 13 by U-bolts 37. The spring extends transversely of the chassis frame and is yieldably fixed thereto at its outer end by a rubber block 38 which is secured to one longitudinal side member 10 of the frame by a strap 39, the outer end of the leaf spring 36 being received in a slot or aperture formed in the block 38.

In Fig. 7 of the drawings, is illustrated a form of the improved power unit mounting in which front and rear mounting members and structure similar to that described above and designated by corresponding numerals are employed. The inclined rear mounting members 30 are, however, relieved of substantially all weight supporting function by providing an intermediate support or steady rest 40 which is disposed between the front and rear resilient members. The steady rest 40 includes a transverse frame member 41 which is rigidly attached at respectively opposite ends to the longitudinal channel members of the chassis frame. Mounted on the transverse member 41 is a resilient pad 42 which preferably comprises a block of rubber having a metal plate 43 rigidly attached to one side, preferably by vulcanization. The plate 43 is fixed to the transverse member 41 by bolts, rivets, or other suitable means and the rubber block 42 is positioned so as to receive a substantially flat surface on the lower side of the oil pan 44 of the crankcase 13 or any other suitable understructure of the crankcase.

By relieving the inclined rear members 30 of weight supporting function they may be more conveniently conditioned to accurately predetermine the natural vibration frequency of the power unit. The provision of a supporting member between the ends of the crankcase eliminates longitudinal sagging of that portion of the unit which is disposed between the front and next rearward weight supporting member of the mounting and renders it possible to employ lighter material in the construction of the housing parts of the power unit.

In the form of the invention shown in Figs. 4, 5, and 6, rear inclined mounting members 30' substantially identical to those described in connection with Figs. 1, 2, and 3, are relied upon to support the weight of the rear end portion of the power unit and to assist in bringing the natural vibration frequency of the unit on its mountings to a desired low value. The front end portion of the power unit is supported by mounting members 45 which are constructed and arranged in such a manner as to permit of their location in spaced relation to that part of the front end of the power unit which is congested considerably by the presence of auxiliary parts of a conventional vehicle power unit, such as the fan, fan belt, fan pulley, and water pump thereof. These mounting members are sufficiently remote from the axis of oscillatory movement 24' of the unit to exert substantial opposition to oscillatory movement of the unit.

Each mounting member 45 includes a rubber block 46 having metal plates 47 and 48 fixed, preferably by vulcanization, to a pair of respectively opposite sides. The plates 48 are rigidly attached by bolts 49 to inwardly extending brackets 50 which are secured to the longitudinal channel members 10' of the chassis frame with which the power unit is associated. The plates 47 are fixed by bolts 51 to a rigid bracket 52 secured to the front end of the power unit and extending transversely of the latter. In the form shown, the brackets 50 and plate 49 have contacting surfaces of curvilinear contour which substantially coincide with portions of a circle having a center on the axis 24' which passes substantially through the center of mass 25' of the power unit.

Planular parts substantially tangent to such a circle may, if desired, be used in place of the curvilinear parts above mentioned. The rubber blocks 46 of the front mounting members accommodate oscillatory movement of the unit about the axis 42' mainly in shear, and the weight of the front end portion of the unit is supported by a combination of compressive and shear stresses of the rubber. Both the front and rear mounting members 45 and 30' are constructed and arranged in such a manner as to bring the frequency at which the unit naturally tends to oscillate about the axis 24' below the frequency of the torque reaction impulses of the engine at the idling and lower end of the driving range of the engine. A leaf spring 36' or other suitable resilient means may be connected between the chassis frame and power unit, if desired, to further assist in accurately predetermining the natural frequency of the unit.

An internal combustion engine power unit mounted in accordance with any of the above mentioned forms of the invention is free to oscillate within a limited range in response to the torque reaction impulses of the engine and about an axis which passes substantially through the center of mass of the unit and as a result the torque reaction impulses are not applied directly upon the chassis frame structure or other portion of a vehicle with intense impact. The oscillatory movement of the unit under the influence of the torque reaction impulses does not cause displacement of the center of mass of the unit and accordingly the reaction upon the chassis structure required to displace the center of mass of the unit is eliminated.

Vibration periods are eliminated by guarding against the occurrence of the torque-reaction impulses in a synchronous or phased relation with the frequency at which the unit naturally tends to oscillate on its mountings during the idling and lower end of the driving range of the engine.

Although but several specific embodiments of the invention are herein shown and described, it will be understood that various changes in the size, shape, and arrangement of parts may be made without departing from the spirit of the invention, and it is not the intention to limit its scope other than by the terms of the appended claims.

What is claimed is:—

1. A mounting for a power unit including an internal combustion engine and having torque transmitting mechanism operatively connected with the rear end of the latter, comprising a frame structure; and means for oscillatively mounting said unit on said frame structure about an axis extending forwardly at an inclination to the crankshaft of said unit and passing substantially through the center of mass of said unit, said means comprising a front mounting member having a resilient element interposed between said frame structure and power unit and located in close proximity to said axis and a pair of oppositely inclined resilient mounting members located rearwardly of and spaced longitudinally from said first mentioned mounting member and interposed between said frame structure and portions of said unit remote from said axis, said rear mounting members being substantially tangent to a circle having its center on said axis.

2. A mounting for a power unit including an internal combustion engine and having torque transmitting mechanism operatively connected with the rear end of the latter, comprising a frame structure; and means for oscillatively mounting said unit on said frame structure about an axis extending substantially through the center of mass of said engine and at an inclination to its crankshaft, said means including a resilient mounting member inclined to conform to the inclination of said axis, interposed between said frame structure and said unit at the front end thereof and located in close proximity to said axis, and a pair of oppositely inclined rear mounting members each interposed between said frame structure and opposite sides of said unit respectively and having resilient elements remote from said axis and spaced rearwardly from said front mounting member.

3. A mounting for a power unit including an internal combustion engine and having torque transmitting mechanism operatively connected with the rear end of the latter, comprising a frame structure; and means for oscillatively mounting said unit on said frame structure about an axis extending substantially through the center of mass of said engine at an inclination to its crankshaft, said means including a rubber mounting member inclined to conform to the inclination of said axis and interposed between said frame structure and the front end of said engine, and a pair of mounting members spaced rearwardly of said first mentioned mounting member each having a rubber block secured to said frame structure and opposite sides of said unit respectively and disposed substantially tangent to a circle having its center on said axis.

4. A mounting for a power unit including an internal combustion engine and having torque transmitting mechanism operatively connected with the rear end of the latter to be driven thereby, comprising a frame structure; and means for oscillatively supporting said unit on an axis extending forwardly at an inclination to the engine crankshaft axis from the rear end of said unit, said means including a front mounting member having a resilient element located in close proximity to said axis, and a pair of rear mounting members spaced from said axis, each having a rubber block constructed and arranged between said unit and frame structure in such a manner as to support a portion of the weight of said engine by a combination of shear and compressive stresses of said rubber blocks and to accommodate oscillatory movement of said unit about said axis in shear.

5. A mounting for a power unit including an internal combustion engine and having torque transmitting mechanism operatively connected with the rear end of the latter to be driven thereby, comprising a frame structure; and means for oscillatively supporting said unit on an axis extending lengthwise of said unit substantially through the center of mass thereof, said means including a front mounting member having a rubber weight supporting element fixed independently to said unit and frame structure respectively and located in close proximity to said axis and a pair of rear mounting members spaced from said axis, each rear mounting member having a rubber block independently secured to and constructed and arranged between said unit and frame structure respectively in such a manner as to support a portion of the weight of said engine by a combination of shear and compressive stresses of said rubber blocks and to accommodate oscillatory movement of said unit about said axis in shear, said rear mounting members being concentrically arranged about a point on said axis.

6. A mounting for a power unit including an internal combustion engine and having torque transmitting mechanism operatively connected with its rear end, comprising a frame structure; and means for oscillatively mounting said unit on said frame structure about an axis extending substantially through the center of mass of said unit, said means including a resilient front mounting member located adjacent said axis and a pair of rear mounting members spaced from said axis laterally of said unit, one rear mounting member being disposed on each side of said unit and each having an outwardly inclined rubber block fixed to said unit and frame respectively, the rubber blocks of said rear mounting members being substantially tangent to a circle having its center on said axis and constructed and arranged in such a manner as to accommodate oscillatory movement of said unit in shear and adapted to yieldably oppose such movement of said unit under the influence of the torque reaction impulses.

7. A mounting for a power unit including an internal combustion engine and having torque transmitting mechanism operatively connected with its rear end, comprising a frame structure; and means for oscillatively mounting said unit on said frame structure about an axis extending substantially through the center of mass of said unit, said means including a resilient front mounting member located closer to the top of said engine than to the lower extremity thereof and in close proximity to said axis and a pair of rear mounting members remote from said axis and located in close proximity to the lower extremity of said engine, one of said rear mounting members being positioned on each side of said unit and each having an outwardly inclined rubber block fixed to said unit and frame structure respectively and constructed and arranged in such a manner as to bring the natural vibration frequency at which said unit tends to oscillate about said axis below the frequency of the torque reaction impulses at the lower end of the driving range of said engine and to support a substantial portion of the weight of said unit.

8. A mounting for a power unit including an internal combustion engine and having torque transmitting mechanism operatively connected with its rear end, comprising a frame structure; and means for oscillatively mounting said unit about an axis inclined forwardly from the rear end of said unit, said means including a front mounting member having a rubber element disposed between and fixed to said unit and frame structure and located in close proximity to said axis and a pair of rear mounting members remote from said axis, one on each side of said unit and each having an outwardly inclined rubber block fixed to said frame structure and unit respectively and so constructed and arranged as to yieldably support a portion of the weight of said unit, to oppose transverse movement thereof mainly by compressive stress of said rubber blocks, and to accommodate oscillatory movement of said unit about said axis by shear stress of said rubber block.

9. A mounting for a power unit including an internal combustion engine; and means for oscillatively mounting said unit about an axis extending substantially through the center of mass of said unit at an inclination to its crankshaft, said means comprising a frame structure and longitudinally spaced pairs of resilient mounting members, one of said pairs of mounting members being located below the adjacent end portion of said axis and the other being located substantially at the elevation of the portion of the axis laterally adjacent thereto, the mounting members of each pair being spaced laterally substantially equal distances and inclined outwardly with respect to the longitudinal center line of said frame and interposed between the latter and opposite sides of said power unit respectively.

10. A mounting for a power unit including an internal combustion engine; and means for oscillatively mounting said unit about an axis extending substantially through the center of mass of said unit, said means comprising a frame structure, a pair of front mounting members, one interposed between the latter and each side of said unit respectively, and each having a rubber element secured to said frame structure and power unit and constructed and arranged to accommodate oscillatory movement of said unit mainly in shear, and a pair of rear mounting members, one interposed between said frame structure and each side of said unit respectively and each having a rubber element secured to said frame structure and power unit and constructed and arranged to accommodate oscillatory movement of said unit in shear, the mounting member of both pairs being spaced laterally from the central vertical plane of said unit so as to participate substantially equally in opposing the torque reaction thereof.

11. A mounting for a power unit including an internal combustion engine; and means for oscillatively mounting said unit about an axis extending substantially through the center of mass of said unit, said means comprising a frame structure, a pair of front mounting members, one interposed between the latter and each side of said unit respectively, and each having a rubber element secured to said frame structure and power unit and constructed and arranged to accommodate oscillatory movement of said unit mainly in shear, and a pair of rear mounting members, one interposed between said frame structure and each side of said unit respectively and each having a rubber element secured to said frame structure and power unit and constructed and arranged to accommodate oscillatory movement of said unit in shear, the said rubber elements of each pair of mounting members being spaced laterally substantially equal distances and inclined outwardly in opposite directions from the longitudinal center line of said frame structure and adapted to oppose lateral movement of said unit by a compressive stress thereof.

12. A mounting for a power unit including an internal combustion engine and having torque transmitting mechanism operatively connected with its rear end, comprising a frame structure, and mechanism for oscillatively mounting said unit about an axis inclined forwardly from the rear end of said unit, said mechanism including front mounting means having rubber disposed between and fixed to said unit and frame structure and a pair of rear mounting members remote from said axis, one on each side of said unit and each having an outwardly inclined rubber block fixed to said frame structure and unit respectively and so constructed and arranged as to yieldably support a portion of the weight of said unit, to oppose transverse movement thereof mainly by compressive stress of said rubber blocks, and to accommodate oscillatory movement of said unit about said axis by shear stress of said rubber block.

13. In a mounting for a power unit including an internal combustion engine and having torque transmitting mechanism operatively connected with the rear end of the latter to be driven thereby, comprising a frame structure; and means for oscillatively supporting said unit on an axis extending in the general direction of the length of said unit, said means including a front mounting member having a resilient element located in close proximity to said axis for yieldably sustaining the weight of the front end portion of said unit, and a pair of rear mounting members spaced from said axis and supporting the entire remaining weight of said unit, each having a rubber block constructed and arranged between said unit and frame structure in such a manner as to support a portion of said remaining weight of said unit by a combination of shear and compressive stresses of said rubber blocks and to accommodate oscillatory movement of said unit about said axis in shear.

14. A mounting for a power unit including an internal combustion engine and having torque transmitting mechanism operatively connected with the rear end of the latter, comprising a frame structure; and means for oscillatively mounting said unit on said frame structure about an axis extending at an inclination to the crankshaft of said unit, said means comprising a front mounting member having a resilient element interposed between said frame structure and power unit and located in close proximity to said axis for yieldably sustaining the weight of the front end portion of said unit, and a pair of oppositely inclined resilient mounting members located rearwardly of and spaced longitudinally from said first mentioned mounting member and interposed between said frame structure and portions of said unit remote from said axis for supporting the entire remaining weight of said unit, said rear mounting being substantially tangent to a circle having its center on said axis.

15. A mounting for a power unit including an internal combustion engine and having torque transmitting mechanism operatively connected with the rear end of the latter to be driven thereby, comprising a frame structure; and mechanism for oscillatively supporting said unit on an axis extending in the general direction of the length of said unit, said mechanism including means for mounting the front end portion of said unit having a resilient element located in close proximity to said axis, and means for mounting the rear end portion of said unit comprising rubber blocks spaced from said axis and constructed and arranged between said unit and frame structure in such a manner as to support a portion of the weight of said unit by a combination of shear and compression stresses of said rubber blocks and to accommodate oscillatory movement of said unit about said axis in shear, all of the rubber blocks of said rear mounting means being so positioned as to accommodate upward vertical movement of the rear end portion of said unit by non-compressive stresses of said blocks.

16. A mounting for a power unit including an internal combustion engine and having torque transmitting mechanism operatively connected with the rear end of the latter to be driven thereby, comprising a frame structure; and mechanism for oscillatively supporting said unit on an axis extending in the general direction of the length of said unit, said mechanism including means for mounting the front end portion of said unit having a rubber element located in close proximity to said axis and so constructed, arranged and disposed between parts of said frame structure and unit as to accommodate displacement of the latter in all directions by compressive stresses of said rubber element, and means for mounting the rear end portion of said unit comprising rubber blocks spaced from said axis and constructed and arranged between said unit and frame structure in such a manner as to support a portion of the weight of said unit by a combination of shear and compression stresses of said rubber blocks and to accommodate oscillatory movement of said unit about said axis in shear, all of the rubber blocks of said rear mounting means being so positioned as to accommodate upward vertical movement of the rear end portion of said unit by non-compressive stresses of said blocks.

VIVIAN HUMPHREY,
*Administratrix of Carroll Le Roy Humphrey, Deceased.*